United States Patent [19]

Miner

[11] 4,121,668
[45] Oct. 24, 1978

[54] MOTOR-DRIVEN CULTIVATOR WITH COUNTER-ROTATING AUGER SHAFTS

[75] Inventor: Earl L. Miner, Long Lane, Mo.

[73] Assignee: Detroit Tool & Engineering Co., Lebanon, Mo.

[21] Appl. No.: 700,760

[22] Filed: Jun. 29, 1976

[51] Int. Cl.² .................................... A01B 33/04
[52] U.S. Cl. ................................ 172/42; 172/58; 175/108; 175/388
[58] Field of Search ............... 172/42, 43, 49, 57, 172/58, 108, 527, 532, 40, 111; 175/108, 388; 52/157

[56] References Cited

U.S. PATENT DOCUMENTS

| | | | |
|---|---|---|---|
| 1,348,325 | 8/1920 | Shean | 175/388 X |
| 1,856,065 | 5/1932 | Austin | 172/40 UX |
| 2,574,353 | 11/1951 | Singer | 172/42 |
| 2,643,599 | 6/1953 | Wharton | 172/57 |
| 2,876,850 | 3/1959 | Starrett | 172/42 |
| 2,930,436 | 3/1960 | Scheidenhelm | 172/49 X |
| 3,603,162 | 9/1971 | Gohler | 172/108 X |

FOREIGN PATENT DOCUMENTS

| | | | |
|---|---|---|---|
| 76,856 | 6/1919 | Austria | 172/532 |
| 173,888 | 2/1953 | Austria | 172/42 |
| H17100 | 8/1956 | Fed. Rep. of Germany | 172/108 |
| 1,049,144 | 1/1959 | Fed. Rep. of Germany | 172/111 |

*Primary Examiner*—Richard T. Stouffer
*Attorney, Agent, or Firm*—Cohn, Powell & Hind

[57] ABSTRACT

This cultivator includes a base, which is carried by a pair of ground wheels, and a motor mounted to the base above a pair of auger assemblies. The motor shaft extends rearwardly of the base and the auger assemblies include elongate shafts rotatively mounted within sleeves attached to the base. The motor shaft and the auger shafts are connected at their rear ends by a chain and sprocket drive assembly which provides counter-rotational motion in the two auger shafts. The forward ends of the auger shafts are each provided with a screw and spaced radial tines of progressively increasing length.

10 Claims, 6 Drawing Figures

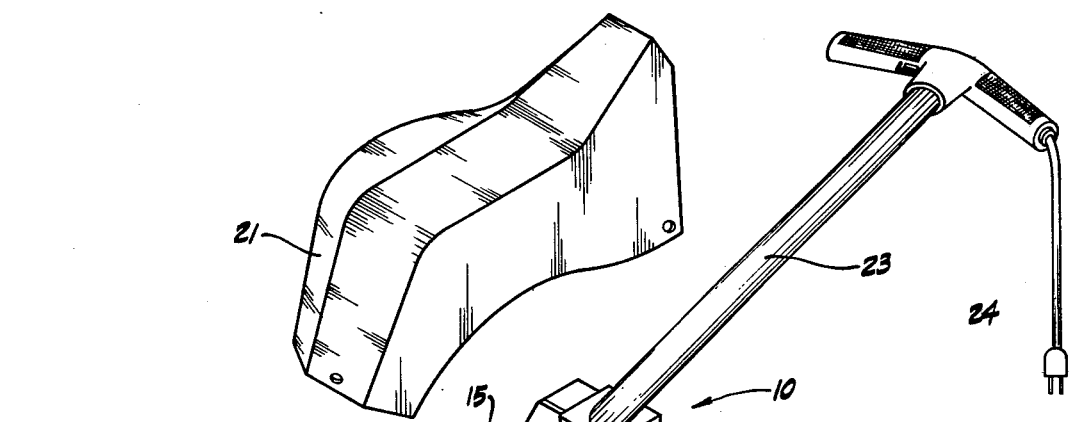
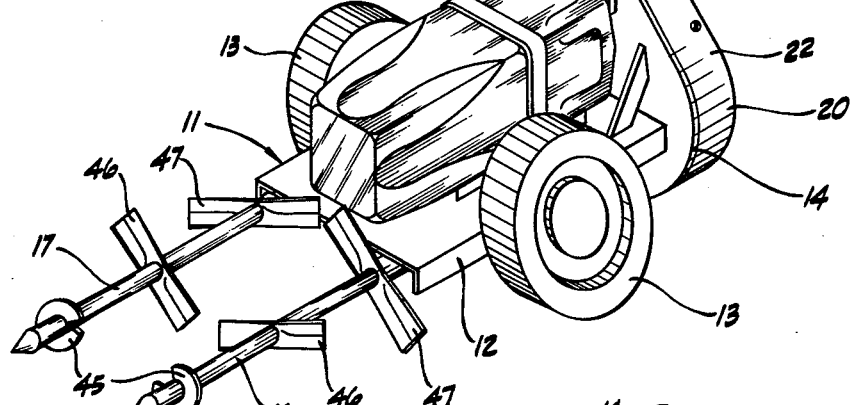
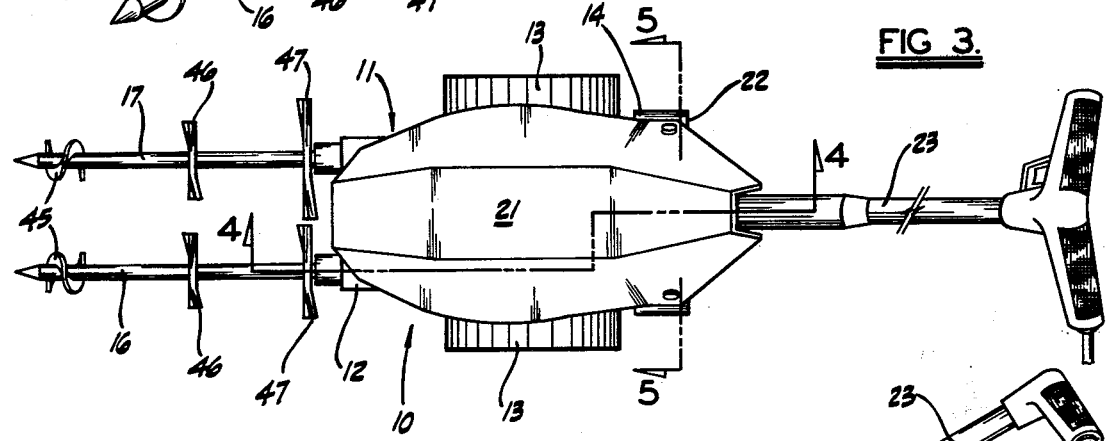
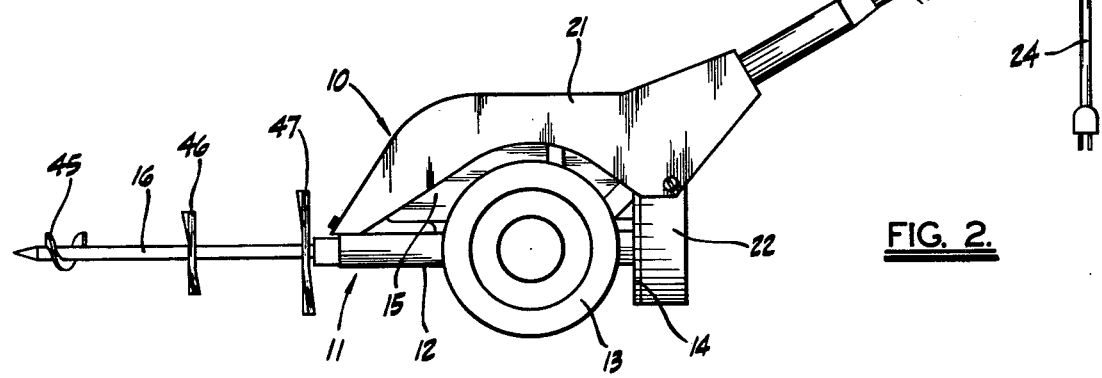

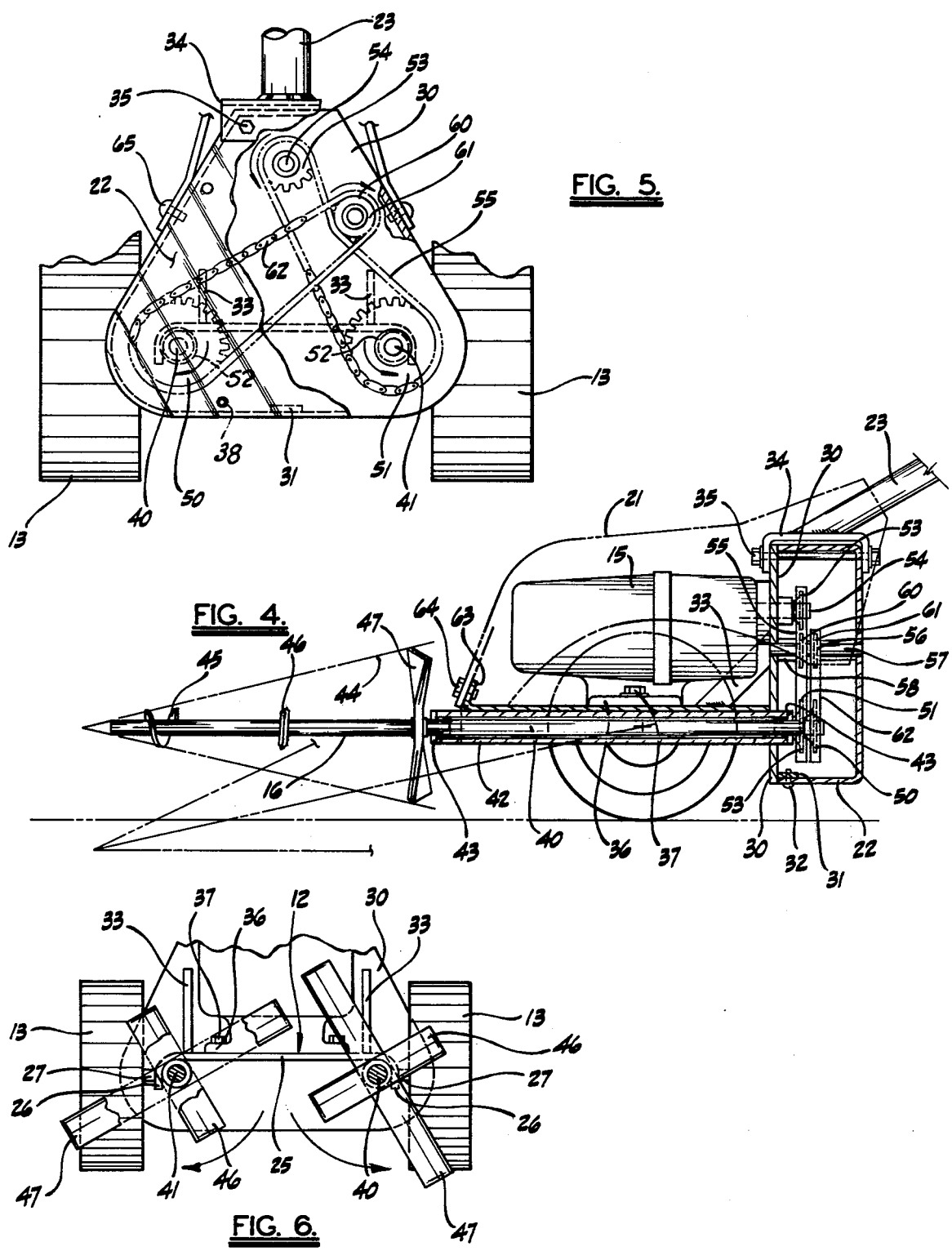

MOTOR-DRIVEN CULTIVATOR WITH COUNTER-ROTATING AUGER SHAFTS

RELATED U.S. APPLICATION DATA

Related to U.S. Application Ser. No. 664,319, Mar. 5, 1976, now U.S. Pat. No. D244,682, June 14, 1977.

BACKGROUND OF THE INVENTION

This invention relates generally to cultivator devices and particularly to a cultivator which employs an auger tilling action.

The most common type of conventional cultivators used for garden work are tillers having power driven, wheel-like tines in front and non-powered wheels in the rear. The revolving tines propel the tiller in a forward direction. In fact, the tines perform the job of propulsion so well that one of the disadvantages inherent in this type of machine is that they are difficult to control and frequently must utilize drag bars to prevent the tines from pulling the machine forward too rapidly and out of control of the operator.

A more expensive tiller, of a similar type, is available having a front wheel, rear tine arrangement. The wheels are powered to control the forward push provided by the rotating blades. The tines must be shielded to protect the operator and, although such tillers are easier to use than the rear wheel type, the cost is even more prohibitive. Indeed, the machines of both types are so expensive that they are usually rented rather than purchased by the user.

Although auger type cultivators are known and disclosed, for example, in U.S. Pat. No. 562,485, No. 2,876,850 and No. 3,714,990, they have not replaced the conventional tillers described above. U.S. Pat. No. 562,485 discloses a four-wheeled device having an inclined auger, which is driven by the rear wheels and employs a specific form of auger construction. U.S. Pat. No. 2,876,850 discloses a device utilizing a series of augers tied together by a gear train assembly, which is located at the front end of the device. Finally, U.S. Pat. No. 3,714,990 discloses an auger plow, which is driven behind a tractor and utilizes augers having cylindrical discharge housings.

None of these devices has met with general acceptance, probably because of the complicated structure and instability of the augers. The present device solves the above problems in a manner not disclosed in the known prior art.

SUMMARY OF THE INVENTION

This cultivator provides a forwardly extending auger assembly and a rearwardly extending handle. The propulsion of the device is facilitated by the action of the augers, but no drag bar is required.

The device provides a two-wheeled base having a rearwardly mounted motor. An auger assembly is mounted below the motor and driven by a drive assembly connecting the motor to the auger assembly at the rear end of the cultivator.

The auger assembly is supported lengthwise of the base between support points spaced apart a distance at least substantially as great as the forwardly projecting length of the auger assembly beyond the base.

The auger assembly includes a pair of elongate sleeves disposed in side-by-side relation and fixedly attached to the base to provide a journal mounting for a pair of auger shafts.

Each auger shaft includes a screw at the remote end and rearwardly spaced blades or tines of progressively increasing radial length defining a longitudinal cutting cone and the blades have a cutting edge as well as an axial twist to provide optimum mixing and cutting characteristics.

The drive assembly includes a drive sprocket attached to the motor shaft and driven sprockets attached to the rear end of the auger shafts. Interconnecting means are provided between said drive and driven sprockets to rotate said auger shafts in opposite directions.

The interconnecting means between the drive and driven sprockets includes an endless chain connecting the drive sprocket and one of said driven sprockets; a combination sprocket having an idler portion driven by said endless chain, and a drive portion which is connected to the other driven sprocket in drive relation by means of another endless chain.

The base includes a lower portion and a fixedly attached upwardly extending rear portion, said lower portion mounting the auger assembly and said rear portion mounting the drive assembly.

The base and drive assembly are provided with removable housings.

BRIEF DESCRIPTION OF THE DRAWINGS

FIG. 1 is a perspective view of a double auger cultivator with the motor housing removed;

FIG. 2 is a side elevational view of the cultivator;

FIG. 3 is a plan view of the cultivator;

FIG. 4 is an enlarged sectional elevation taken on line 4—4 of FIG. 3;

FIG. 5 is an enlarged fragmentary rear end view; and

FIG. 6 is an enlarged, fragmentary front end view of the cultivator.

DESCRIPTION OF THE PREFERRED EMBODIMENT

Referring now by reference numerals to the drawings and first to FIG. 1, it will be understood that the cultivator device is generally indicated by numeral 10 and comprises essentially a base 11, having a lower portion 12 mounted on ground wheels 13, and a rear portion 14 fixedly attached to said lower portion 12. A motor 15 is rearwardly mounted to the base lower portion 12, and a pair of auger assemblies 16 and 17 are rotatably mounted to the base 11. The auger assemblies 16 and 17 are rotated in opposite directions by a drive assembly, generally indicated by numeral 20, which is disposed at the rear end of the device and interconnects the motor 15 and the auger assemblies 16 and 17. The motor 15 and the drive assembly 20 are provided with covers 21 and 22 respectively. The cultivator device 10 also includes a push handle 23, which provides a conduit for a power cable 24 supplying power to the motor 15, which is an electric motor in the embodiment shown. However, it will be readily understood that a gasoline engine could be used if desired. The component parts of the device 10 will now be described with particular reference to FIGS. 4, 5 and 6.

As shown in FIGS. 5 and 6, the base lower portion 12 is substantially channel-shaped and includes a horizontal portion 25 and depending side portions 26 having stub axles 27 welded, or otherwise attached thereto, for mounting the ground wheels 13. The upwardly extending base rear portion 14 is provided by a generally triangular vertical plate 30 having lugs 31 formed thereon to which the drive assembly cover 22 is attached as by fastener 32. Additional fasteners 38, see FIG. 5, extending between the cover 22 and the plate 30, are also provided to connect said cover and plate. The lower and rear base portions 12 and 14 are rigidly attached together as by welding, and inclined stiffener members 33 are welded between said base portions 25 and 30 to enhance the rigidity of the base structure as a whole. The handle 23 is provided with a U-shaped end portion 34, which is attached between the cover 22 and vertical plate 30 as by a pair of bolts 35, the handle thereby being rendered removable.

The motor 15 is provided with lugs 36 and is attached above the base lower portion 25 as by fasteners 37. The auger assemblies 16 and 17 include shafts 40 and 41 respectively. The auger assemblies, including shafts 40 and 41, are identical except for the shaft drive connection and the orientation of the cutting parts, and will therefore be described with reference to auger assembly 16. As shown in FIG. 4, auger assembly 16 includes a sleeve 42 which is welded, or otherwise attached, to an inside corner of the channel-shaped base lower portion 12, said corner being defined by horizontal portion 25 and associated depending side portion 26. The sleeve 42 extends beyond each end of the base lower portion 12 and both ends are provided with bushings 43 which support the rearward portion of the shaft 40 in journal relation. The forward portion of each elongate shaft is provided with a cutting means which includes a screw portion 45 at the remote end and radial blades or tines 46 and 47 spaced lengthwise of the shaft and fixedly attached thereto. Blades 46 and 47 are disposed in a plane transverse to the direction of travel of the cultivator 10 and are right-angularly disposed relative to each other, as shown in FIG. 6. The blades are of a length substantially proportionate to their distance from said auger screw portion 45 and provide a substantially conical cutting cone indicated in phantom outline in FIG. 4 by numeral 44. As shown in FIG. 5, the rear end of each auger shaft 40 and 41 is provided with a driven sprocket 50 having a boss 52. The sprocket bosses 52 are relatively reversely end-to-end and are attached to their associated shaft so that the sprockets 50 and 51 have planes of rotation spaced from each other by virtue of the disposition of said bosses.

The sprockets 50 and 51 provide part of the drive assembly 20 by which the shafts of the auger assemblies 16 and 17 are rotated. In addition to these sprockets, the drive assembly 20 includes a drive sprocket 53 attached to the rearwardly disposed motor shaft 54 which extends through the upwardly extending plate 30. The motor drive sprocket 53 and the auger driven sprocket 51 are in the same plane and are connected by an endless chain 55. An idler-drive combination sprocket 56, fixedly attached to a rotatable sleeve 58, is mounted to a stub shaft 57, which is fixedly attached to the plate 30 as by welding. As best shown in FIG. 4, the stub shaft 57 extends between plate 30 and the cover 22 and is supported as by an aperture provided in said cover 22. The combination sprocket 56 includes an idler portion 60 and a coaxial drive portion 61. The idler portion 60 is disposed in the same plane as the endless chain 55, and is located in a position to be engaged and driven by said chain 55. The drive portion 61 is disposed in the same plane as the auger driven sprocket 50, and is connected to said sprocket 50 by a second endless chain 62, which drives said auger shaft 40 in a counter-rotational direction to the direction of said auger shaft 41.

The location of the combination sprocket 56, relative to the chain 55 and sprockets 53 and 51, is such that the auger driven sprockets 50 and 51 rotate at substantially the same speed although in opposite directions. In the preferred embodiment, the drive sprocket 53 is provided with 10 teeth and each of the driven sprockets 50 and 51 with 30 teeth. The idler and drive portions of the combination sprocket 56 are provided with 15 teeth and the sprocket is located substantially one-third of the distance between the rotational centers of sprockets 53 and 51. The result of this arrangement is that the auger sprockets are driven at a reduced speed of one to three as compared with the motor drive sprocket 53.

The cover 21 which provides a baffle as well as a housing for the motor 15, is attached at its front end to a lug 63, provided on the base lower portion 12, by means of a fastener 64. The cover 21 is also attached at each side to the cover 22, which provides a housing for the drive assembly 20, as by fasteners 65.

It will be understood that because of the connection of the elongate sleeves 42 to the base 11, and because of the rearwardly disposed drive assembly 20, the shafts 40 and 41 are supported by bushings 43 at spaced points representing a considerable proportion of the overall length of the shafts. In the preferred embodiment this length between support bushings is in excess of the unsupported length of said shafts which projects forwardly of said sleeves, and it will be understood that this structural arrangement of parts enhances the stability of said auger shafts considerably. As shown in FIGS. 2 and 3 the sleeves 42 extend forwardly of the base 11 and this extension can be increased to produce even greater stability. Further, in lieu of continuous sleeves the support can be provided by lengthwise spaced, shorter sleeves having bushings of each end or other suitable bearing means. In addition, the provision of an auger screw portion 45 at the remote end of each of the shafts 40 and 41 and the provision of radial tines 46 and 47 provides a superior cutting cone. The action of the cultivator is smooth and starts by raising the handle 23 which results in the auger point engaging the earth as shown in FIG. 4 in phantom outline. The cultivating and tilling action starts at the auger point and progresses backwardly to each successively larger tine. Cutting speed is controlled by the auger lead and the rotational speed of the auger. Rocks are rolled aside rather than being impacted to damage the tines 46 and 47, and the angle of engagement keeps the tines in the ground at a constant desired depth. The auger screw portions 45 act as guides or stabilizers in starting, and during operation. A slight push starts the cultivating action and releasing pressure stops it. The cultivator is reversed by simply pulling backwards. The blades of each auger assembly are set out of phase with each other which permits the auger assemblies to be located closer together, and the counter rotating cutting action of the blades eliminates any torque so that the device can be easily controlled.

The cultivator can be used for digging in addition to cultivating and tilling. The digging action is accomplished by first inserting the auger screw portions 45 into the ground and then inclining the shafts 40 and 41 to a suitable angle of inclination of about 60°. Such inclination provides that the ground wheels 13 are elevated and results in the weight of the device being utilized to facilitate the digging action. By rocking the device backwards toward the horizontal position the blades tend to move upwardly from below, cutting roots and the like.

In addition to the above, the cultivator can also be oriented to a position in which the shafts 40 and 41 are substantially vertical so that it performs somewhat in the same manner of a kitchen mixer and can be used to mix conditioner additives to the soil. The provision of a variable speed motor further enhances the soil conditioning capability by permitting a slower speed to be used in those instances in which it is desirable not to pulverize the soil too finely.

Further, the rotative mounting of the rearward portion of the shafts 40 and 41 to the base portion 12 provides lengthwise support for said shafts such that transverse forces applied to the forward portion during operation are resisted by a force couple provided by the mounting of the rearward portion.

I claim as my invention:

1. A cultivator device comprising:
   (a) base means including a lower portion having front and rear ends,
   (b) a pair of ground wheels operatively carrying the base means and having an axis of rotation disposed intermediate said front and rear ends,
   (c) motor means carried by the base means and including a rearwardly extending drive shaft means,
   (d) auger means including a pair of sleeves means attached to said lower portion in side-by-side relation and a pair of shaft means disposed below and parallel to the driveshaft means and above the ground engaging wheel surface when said auger shaft means are horizontal, each of said shaft means including a forward portion having cutting means and a rearward portion rotatively mounted in said sleeve means, said sleeve means supporting said rearward portion both forwardly and rearwardly of said ground wheel axis,
   (e) drive means at the rear end of the base means connecting the motor drive shaft means to the rearward end of each auger shaft means for counter rotational movement of said auger shaft means, and
   (f) handle means substantially non-hingedly operatively connected to the base means in rearwardly extending relation for pivoting said base means about said ground wheels tending to lower said cutting means toward ground engagement and raise said drive means away from ground engagement when said handle means is raised.

2. A cultivator device comprising:
   (a) base means including a lower portion having front and rear ends,
   (b) a pair of ground wheels operatively carrying the base means and having an axis of rotation disposed intermediate said front and rear ends,
   (c) motor means operatively mounted on the lower portion of the base means and extending both forwardly and rearwardly of the ground wheel axis and including a rearwardly extending drive shaft means,
   (d) auger means including a pair of shaft means disposed below and parallel to the drive shaft means and above the ground engaging wheel surface when the auger shaft means are horizontal, said shaft means including a forward portion having cutting means and a rearward portion rotatively mounted to said base means forwardly and rearwardly of said ground wheel axis, the distance between said motor shaft means and said auger shaft means being less than the length of the base means to define a relatively low, compact structural arrangement of parts,
   (e) drive means at the rear end of the base means connecting the motor drive shaft means to the rearward end of each auger shaft means for counter rotational movement of said auger means, and
   (f) handle means substantially non-hingedly operatively connected to the base means in rearwardly extending relation for pivoting said base means about said ground wheels tending to lower said cutting means toward ground engagement and raise said drive means away from ground engagement when said handle means is raised.

3. A cultivator device comprising:
   (a) base means including a U-shaped lower portion having front and rear ends and side portions,
   (b) a transversely extending transmission housing attached to said rear end,
   (c) a pair of ground wheels operatively carrying the base means and having an axis of rotation disposed forwardly of said housing,
   (d) motor means mounted to said lower portion and including a rearwardly extending drive shaft extending into said transmission housing,
   (e) auger means including:
      (1) a pair of sleeves disposed in side-by-side relation and extending lengthwise of said lower portion on each side of said ground wheel axis and fixedly attached to said lower portion inwardly adjacent said side portions, and
      (2) a pair of shafts disposed below and parallel to said drive shaft and above the ground engaging wheel surface when said shafts are horizontal and rotatably mounted within associated sleeves, each shaft having a forward portion projecting outwardly of said associated sleeve at one end and having cutting means attached thereto, and each shaft having a rearward end projecting outwardly of said associated sleeve at the other end and into said transmission housing,
   (f) drive means mounted within said transmission housing and connecting said motor shaft to said rearward end of each auger shaft for counter rotational movement of said shafts, and
   (g) handle means substantially non-hingedly operatively connected to the base means in rearwardly extending relation for pivoting said base means about said ground wheels tending to lower said cutting means toward ground engagement and raise said drive means away from ground engagement when said handle means is raised.

4. A device as defined in claim 3, in which:
   (h) the transmission housing depends below the base lower portion side portions, and
   (i) the handle means is operatively mounted to the base means for pivoting said drive means housing about the ground wheels upwardly away from a ground engagement position when said auger means are pivoted downwardly into a ground engagement position, and downwardly into a rest position when said auger means are pivoted upwardly into a non-ground engagement position.

5. A cultivator device comprising:
   (a) base means,
   (b) a pair of ground wheels operatively carrying the base means, (c) handle means operatively connected to the base means in rearwardly extending relation for pivoting said base means about the ground wheels,
(d) motor means carried by the base means, and
(e) auger means including a pair of shafts operatively mounted to the base means and each including a rearward portion operatively connected to the motor means in counter rotating drive relation and a forward portion having cutting means, said cutting means including:
   (1) a substantially helical screw portion disposed about said shaft substantially at the remote end thereof, and
   (2) a first radial blade spaced from said screw portion said blade having a generally flat blade portion with opposing flat faces thereof lying generally in a plane transversely related to the axis of the shaft, and
   (3) said screw portion and said first radial blade cooperating to define a substantially cone-shaped digging envelope said screw portion entering the ground at an angle and tending to urge the device forwardly and said radial blade entering the ground in cutting relation when the base means is pivoted by raising said handle means.

6. A device as defined in claim 5, in which:
(f) a second radial blade is spaced from said first radial blade, said second radial blade having a generally flat blade portion with opposing flat faces thereof lying generally in a plane transversely related to the axis of the shaft, and having a radial length substantially greater than said first radial blade, said screw portion and said first and second radial blades cooperating to define a substantially cone-shaped digging envelope.

7. A cultivator device comprising:
(a) base means having front and rear ends,
(b) a pair of ground wheels operatively carrying the base means and having an axis of rotation disposed intermediate said front and rear ends,
(c) motor means carried by the base means and including a rearwardly extending drive shaft means,
(d) auger means including a pair of shaft means disposed below and parallel to the drive shaft means and above the ground engaging wheel surface when said auger shaft means are horizontal said shaft means including a forward portion having cutting means and a rearward portion rotatively mounted to the base means and supported by journal bearing means both forwardly and rearwardly of the ground wheel axis,
(e) drive means at the rear end of the base means connecting the motor drive shaft means to the rearward end of the pair of auger shaft means for counter rotational movement of said auger shaft means, and
(f) handle means substantially non-hingedly operatively connected to the base means in rearwardly extending relation for pivoting said base means about said ground wheels tending to lower said cutting means toward ground engagement and raise said drive means away from ground engagement when said handle means is raised.

8. A cultivator device comprising:
(a) base means including a lower portion having front and rear ends,
(b) a pair of ground wheels operatively carrying the base means and having an axis of rotation disposed intermediate said front and rear ends,
(c) motor means operatively mounted on the lower portion of the base means and extending both forwardly and rearwardly on each side of the ground wheel axis and including a rearwardly extending drive shaft means,
(d) auger means including a pair of shaft means disposed below and parallel to the drive shaft means and above the ground engaging wheel surface when the auger shaft means are horizontal, said shaft means including a forward portion having cutting means and a rearward portion rotatively mounted to said base means forwardly and rearwardly of said ground wheel axis, the distance between said motor shaft means and said auger shaft means being less than the length of the base means to define a relatively low, compact structural arrangement of parts,
(e) drive means at the rear end of the base means connecting the motor drive shaft means to the rearward end of each auger shaft means for counter rotational movement of said auger shaft means,
(f) handle means operatively connected to the base means in rearwardly extending relation for pivoting said base means about said ground wheels tending to lower said cutting means toward ground engagement and raise said drive means away from ground engagement when said handle means is raised, and
(g) the drive means including:
   (1) a drive element attached to the drive shaft means,
   (2) a driven element attached to the rear end of each of said auger shaft means,
   (3) interconnecting means between said drive and driven elements rotating said driven elements in opposite directions, and
   (4) said drive shaft means being disposed vertically above said auger shaft means a distance substantially the same or less than the horizontal distance between said auger shaft means to further define a relatively low compact arrangement of parts.

9. A device as defined in claim 8, in which:
(h) the interconnecting means includes:
   (1) an endless flexible element extending between said drive element and one of said driven elements,
   (2) a rotatable combination element having an idler portion and a drive portion, said combination element being disposed intermediate said drive element and said one driven element and having said idler portion engageable with said flexible element, and
   (3) a second endless flexible element extending between said drive portion and said other driven element.

10. A cultivator device comprising:
(a) base means having front and rear ends,
(b) a pair of ground wheels operatively carrying the base means and having an axis of rotation disposed intermediate said front and rear ends,
(c) motor means carried by the base means and including a rearwardly extending drive shaft means,
(d) auger means including a pair of shaft means disposed below and parallel to the drive shaft means and above the ground engaging wheel surface when said auger shaft means are horizontal said shaft means including a forward portion having cutting means and a rearward portion rotatively mounted to the base means and supported by journal bearing means both forwardly and rearwardly of the ground wheel axis, (e) drive means at the rear end of the base means connecting the motor drive shaft means to the rearward end of the pair of auger shaft means for counter rotational movement of said auger shaft means, (f) handle means operatively connected to the base means in rearwardly extending relation for pivoting said base means about said ground wheels tending to lower said cutting means toward ground engagement and raise said drive means away from ground engagement when said handle means is raised, and (g) the overall longitudinal distance between the journal bearing means supporting the auger shaft means being substantially greater than the vertical distance between said auger shaft means and said motor shaft means to define a relatively low compact unit.

* * * * *